(12) United States Patent
Salmon-Folgueras et al.

(10) Patent No.: US 9,428,913 B2
(45) Date of Patent: Aug. 30, 2016

(54) MODULAR THERMAL INSULATION SYSTEM FOR BUILDINGS

(71) Applicant: Instituto Tecnologico Y De Estudios Superiores De Monterrey, Monterrey (MX)

(72) Inventors: Jose Rodrigo Salmon-Folgueras, Monterrey (MX); Roberto Parra-Saldivar, Monterrey (MX); Pamela del Carmen Duran-Soriano, Monterrey (MX); Miguel Angel de Jesus Flores-Sanchez, Monterrey (MX); Andres Marcelo Cortes-Guerra, Monterrey (MX)

(73) Assignee: Instituto Tecnologico Y de Estudios Superiores de Monterrey, Monterrey, Nuevo Leon (MX)

( * ) Notice: Subject to any disclaimer, the term of this patent is extended or adjusted under 35 U.S.C. 154(b) by 0 days.

(21) Appl. No.: 14/646,566

(22) PCT Filed: Nov. 28, 2013

(86) PCT No.: PCT/MX2013/000150
§ 371 (c)(1),
(2) Date: May 21, 2015

(87) PCT Pub. No.: WO2014/084704
PCT Pub. Date: Jun. 5, 2014

(65) Prior Publication Data
US 2015/0337535 A1 Nov. 26, 2015

(30) Foreign Application Priority Data

Nov. 30, 2012 (MX) .................. MX/A/2012/013983

(51) Int. Cl.
*E04D 13/18* (2014.01)
*E04D 11/00* (2006.01)
(Continued)

(52) U.S. Cl.
CPC ............. *E04D 11/002* (2013.01); *A01G 1/007* (2013.01); *E04B 1/76* (2013.01); *Y02B 80/32* (2013.01)

(58) Field of Classification Search
CPC ....... E04D 11/002; E04B 1/76; A01G 1/007; Y02B 80/32
USPC ................................. 47/65.9, 65.7; 52/173.1
See application file for complete search history.

(56) References Cited

U.S. PATENT DOCUMENTS 4,058,930 A * 11/1977 Miles ........................ A01G 9/02
47/58.1 R
5,419,080 A * 5/1995 Buss ...................... A01G 9/104
47/73

(Continued)

FOREIGN PATENT DOCUMENTS

KR 20060020916 A 3/2006

OTHER PUBLICATIONS

International Search Report and Written Opinion and English translation for international application No. PCT/MX2013/000150 dated Apr. 2, 2014.

*Primary Examiner* — Basil Katcheves
*Assistant Examiner* — Joshua Ihezie
(74) *Attorney, Agent, or Firm* — Husch Blackwell LLP

(57) ABSTRACT

The modular thermal insulating system based on a mixture of organic and inorganic compounds, constituted to reduce the transfer of heat between the interior and the exterior of a building. Said system, based on a mixture of organic and inorganic compounds, consists of a rigid planar container of prismatic form, formed of a plastic or metal material or a combination of both thereof, containing a first layer, in the form of a porous mixture of organic and inorganic compounds, being over a base and anchorage structure composed of at least a sheet of plastic resins installed above a thermal insulant, being the layer in contact with a rigid base, a set of anchorage elements and, a set of elements to increase the separation of the base element from the roof or wall.

15 Claims, 3 Drawing Sheets

(51) Int. Cl.
*E04B 1/76* (2006.01)
*A01G 1/00* (2006.01)

(56) References Cited

U.S. PATENT DOCUMENTS

| | | | | |
|---|---|---|---|---|
| 5,608,989 | A * | 3/1997 | Behrens | E04D 11/002 47/1.01 R |
| 6,606,823 | B1 * | 8/2003 | McDonough | E04D 11/002 47/65.9 |
| 6,711,851 | B2 * | 3/2004 | Mischo | A01G 1/007 47/65.9 |
| 8,209,905 | B2 * | 7/2012 | Furumura | A01G 27/02 47/65.9 |
| 8,479,443 | B2 * | 7/2013 | Buist | A01G 1/007 47/65.9 |
| 8,966,817 | B2 * | 3/2015 | Cronk | A01G 9/025 47/65.5 |
| 2005/0044791 | A1 * | 3/2005 | Morandini | A01G 9/00 47/65.9 |
| 2006/0070299 | A1 * | 4/2006 | Furumura | A01G 9/02 47/69 |
| 2007/0094927 | A1 | 5/2007 | Perry | |
| 2007/0101646 | A1 * | 5/2007 | Licht | A01G 9/02 47/86 |
| 2007/0253785 | A1 * | 11/2007 | Tyler | B09B 3/00 405/302.6 |
| 2008/0003445 | A1 * | 1/2008 | Okuda | C04B 33/04 428/543 |
| 2010/0325975 | A1 * | 12/2010 | Mischo | E04D 7/005 52/173.3 |
| 2011/0030291 | A1 * | 2/2011 | Whitfield | E04D 11/002 52/173.1 |
| 2011/0197523 | A1 * | 8/2011 | Dubner | E04D 11/002 52/173.1 |
| 2011/0289839 | A1 * | 12/2011 | Cronk | A01G 1/007 47/65.7 |

* cited by examiner

MODULAR THERMAL INSULATION SYSTEM FOR BUILDINGS

OBJECT OF THE INVENTION

The present patent application has as inventive object hereof the provision of a system of thermal insulation and water retention, based on a porous mixture of organic and inorganic compounds, the benefit whereof would be a reduction in the transfer of heat into the building whereupon said system is located.

BACKGROUND

An insulant, in the simple form thereof, is a material characterized by the high thermal resistance thereof, forming a barrier to prevent heat output from and input into a closed system. This effect is achieved utilizing porous or fibrous materials capable of immobilizing the dry air and confining it in small cells. One of the best insulants is a vacuum however, due to the difficulty of maintaining a vacuum, air or the aforementioned materials are used.

Insulants have been widely developed over thousands of years for diverse applications. One of the first needs which human beings sought to satisfy, commencing from learning to modify the environment thereof, was that of shelter, vouchsafing them protection from the inclemency of the weather. The first hideouts were caves, however as human beings learned to make better use of tools and natural elements, these evolved into houses built with a diversity of materials, providing unique characteristics according to the constructive material.

In recent years the development of insulants has become generalized, seeking not solely to insulate buildings thermally, but also acoustically, by virtue of the fact that human activities today generate a considerable quantity of noise in external environments. Furthermore, in recent years insulants have acquired great importance by virtue of the fact that people seek to save electrical energy, utilized to supply a heater or an air conditioner, apparatuses which make very great use of electricity.

The patent application WO2005078211A1 comprises a plurality of panels installed on a subjacent surface. Each of the panels comprises a base having a web having an upper portion, a supporting layer positioned adjacent to the upper part of the web, and a plurality of water retention compartments formed in the web. Nevertheless, having said compartments increases the total weight of each of the units of the panels by virtue of the fact that the water is contained both in the growth medium for the plants and in the water retention compartments. Differing from the system proposed in this patent application, these disadvantages do not arise due to the layout thereof.

The patent application WO2009132439 comprises a tray containing a growth medium and vegetation, a permeable membrane and drainage board. Said tray is mounted upon the permeable membrane, the latter being upon the drainage board. Said configuration permits that the water received by the tray may pass through the membrane to the drainage board, without allowing the passage of the growth medium, however it does not ensure that the growth medium will not filter into the space which may exist between the tray and the permeable membrane. Differing from the system proposed in this patent application, these advantages do not occur, due to the layout thereof.

The patent application WO20071199866 provides an impermeable structure having a double guide floor, installed on a roof, such that the water is naturally guided and drained to a drainage orifice. A further object of the invention is to permit that the water be drained between the spaces of the panels, instead of from the space therebeneath. Additionally, an object of the invention is to provide at least one layer of insulated air beneath the double roof structure, using the air as insulant of the building. Said system presents a series of difficulties, the first being the reduced quantity of water which the system can retain, increasing the expense which must be incurred in maintenance if it is desired that it be used as a green roof. Furthermore, if a large volume of insulated air is desired to be had, the drainage areas must be reduced, or vice versa if it is desired to drain more water. Differing from the system proposed in this patent application, these disadvantages do not occur, due to the layout thereof.

DETAILED DESCRIPTION OF THE INVENTION

Figure 1:
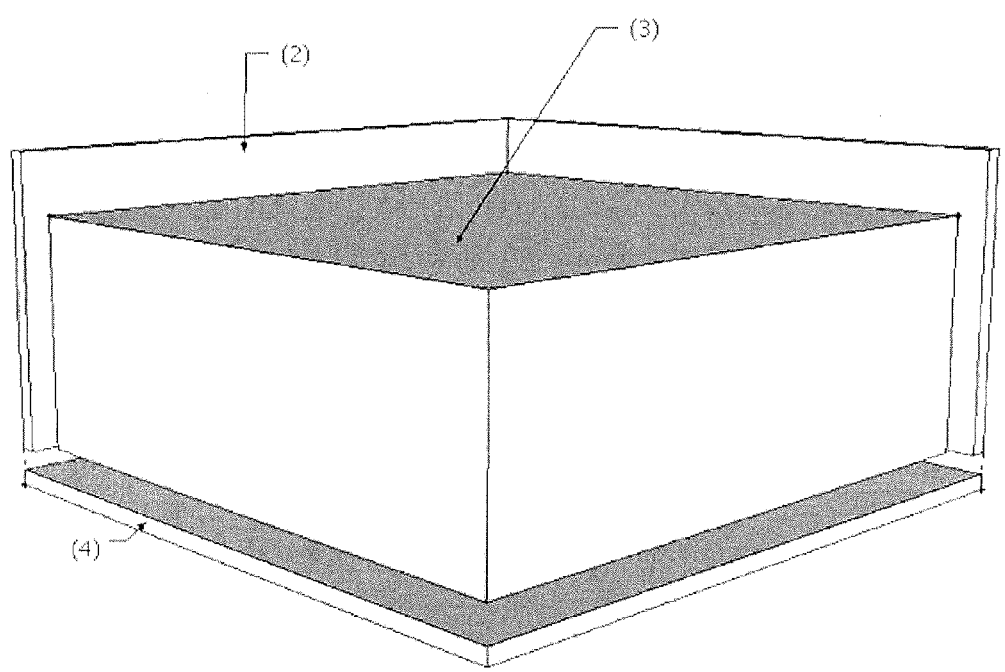
FIG. 1. Isometric diagrammatic cutout view showing the 3 principal parts forming a module of the insulating system object of this patent application.
Figure 2:
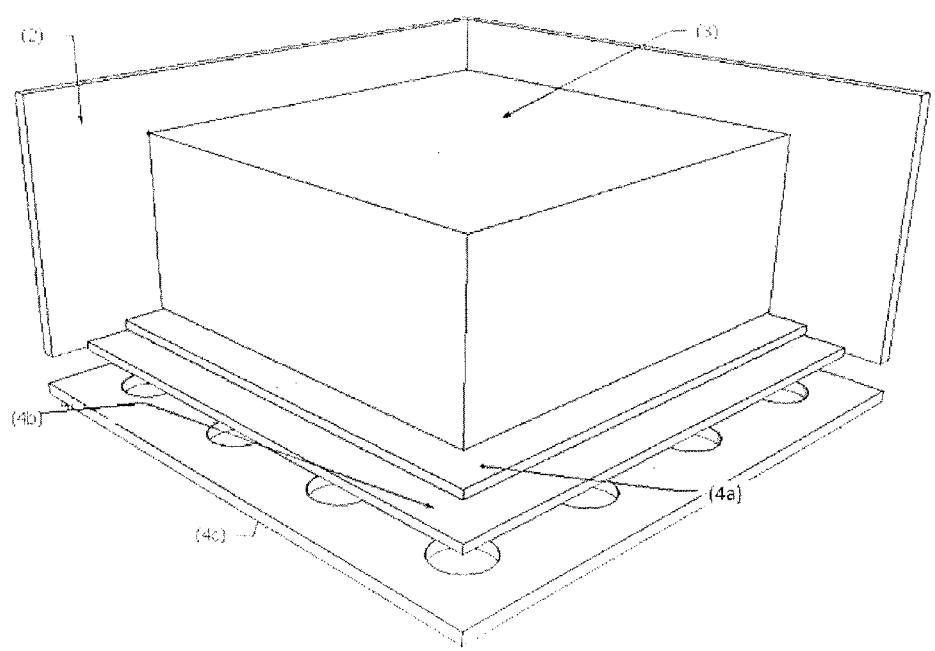
FIG. 2. Upper view of the isometric diagrammatic cutout view, showing the filter layers forming the porous mixture of inorganic compound.
Figure 3:
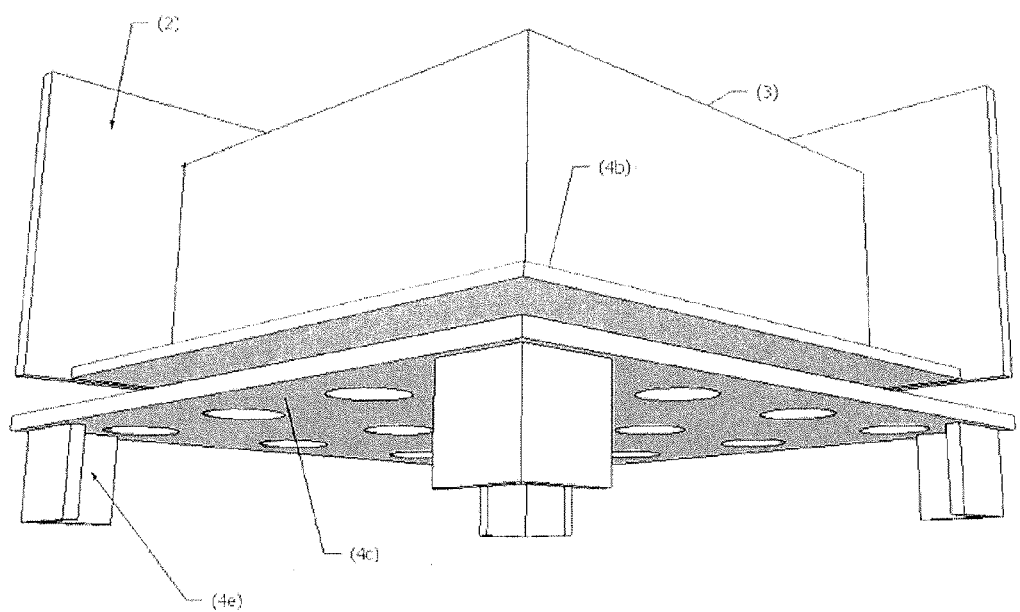
FIG. 3. Lower view of the isometric diagrammatic cutout view showing the assembly of elevating elements of the insulating system and the perforated area of the base and anchorage structure of the insulating system, object of the present patent application.

The thermal insulating system object of the present patent application is formed of a plurality of modules joined one to another, together forming a system having characteristics increasing the area proportionally to the number of modules installed. In FIG. 1 there may be observed a diagrammatic cutout view showing the principal parts forming each module and being described below. Each module of the system is formed by:

a) a planar rigid container (2), consisting of a prism of polygonal cross-section, preferably quadrangular, or a combination from among quadrangular, hexagonal and triangular. It is formed of a material being plastic, such as polyvinyl chloride, vinyl acetate, polymethylmethacrylate and Duroplast, metal, such as aluminum and stainless steel, or a combination of both thereof, such as plastic steel paste, epoxy paste and bronze paste; the composition thereof varying according to the atmospheric and climatic conditions of the location, in locations proximate to saltwater masses the use is recommended of corrosion-resistant plastic materials and metals, such as stainless steel, while for locations having a dry or damp climate, the use is recommended of metals, such as stainless steel and aluminum, and to the load-bearing capacity of the building whereupon it will be installed. The container (2) is a prism the depth whereof varies according to the insulating effect desired, being subject to equation 1:

$$\Delta T = 4*(\text{Centimeters depth}) \qquad \text{Equation 1.}$$

where:
$\Delta T$=average temperature gradient
The container contains:

b) a porous mixture of organic compounds (3), such as top soil and clayey soil, and inorganic compounds such as gravel, stones and polyacrylates, this entire mixture being distributed in a uniform and homogenous manner over the length and width of the container. Of the total volume of the mixture, a minimum of 80% must be of organic compounds, while the inorganic compounds must not exceed 20% of the total volume of the mixture. Said porous mixture is formed by a layer having a thickness of at least 75% of the height of the rigid container containing it. The composition and the thickness of this layer are directly related to the insulating property of each module by equation 1.

The above porous mixture is located above:

c) a base and anchorage structure (4), comprising at least two filter layers (4a and 4b), a rigid base (4c), a set of anchorage elements and a set of elements to increase the separation (4e) of the base element (4c) from the roof or wall. The filter layers having as objective thereof to restrict the passage of certain materials or compounds, protecting the container and that part of the building in contact with the thermal insulating system (1). Said filter layers are:

a. a first filter layer (4a), consisting of a film of plastic resins such as polyacrylate, polyvinyl chloride, glass fiber, preventing the porous mixture from filtering to the lower layers and protecting against the degradation which the porous mixture may cause to the lower layers and the interior part of the container. Furthermore, this layer prevents the growth of roots by means whereof the growth of plants may be controlled, if it is permitted that such be accommodated in the mixture.

b. a second impermeable insulating layer (4b) of expanded polystyrene, extruded polystyrene, foam glass and expanded cork having as function thereof to increase the insulating capacity of the system. Additionally, the insulants are impermeable consequently preventing water leaks in the system which may affect the building being insulated.

c. beneath the first and second filter layers (4a and 4b) there is a rigid metal base (4c), for example of steel, supporting the container, the porous mixture and the filter layers. Said base has a maximum perforated area of 50% permitting the drainage of excess water which may become lodged in the mixture. For this reason, said perforated area is distributed preferably in circles arranged uniformly on the entire surface thereof. The aforementioned area depends on the load capacity of the building, on the atmospheric conditions of the location, and on the quantity of water which it is desired be retained in the mixture (3).

d. a set of anchorage elements serving to affix each module of the system to a surface of the building, wherein the thermal insulant system is located. Said set of anchorage elements may be, inter alia, a plurality of bolts, adhesives, joints.

e. a set of elements to increase the separation (4e) of the base element (4c) from the roof or wall in such manner as to wholly or partially suspend each module at a certain distance above the surface to be insulated. The maximum separation distance is 0.50 m or 20 inches. The set of elements to increase the separation (4e) is a plurality of legs, boards, mounts or platforms, distributed in such manner as to wholly support the weight.

EXAMPLE OF PREFERRED EMBODIMENT

In a preferred embodiment, the modular thermal insulation system comprises a plastic container, more specifically of vinyl polyacrylate. The measurements of said container are 1 m² by 0.10 m in depth, located on the roof of an insulated prototype room of 1 m².

The total volume of the porous mixture of organic and inorganic compounds is composed of top soil 90%, 0.3175 cm (⅛ inch) gravel 4%, 0.1587 cm (1/16 inch) sand 4%, 0.1587 cm (1/16 inch) stones 1% and 0.1058 cm (1/24 inch) sodium polyacrylates 1%. The first filter layer is a film of high-density polyethylene (HDPE) of 0.75 mm thickness, Geplex brand. The second filter layer is a sheet of polyisocyanate of 0.75 mm thickness, AISLADECK brand. Both filter layers cover the entirety of the length and width of the container. The insulated prototype room was exposed with the thermal insulation system for 48 hours at an ambient temperature from 26° C. to 32° C. and the temperature was recorded in the interior of the room, there being an average temperature differential of 4° C.

We claim:

1. A modular thermal insulating system based on a porous mixture of organic and inorganic compounds comprising:
   a) a rigid planar container of prismatic shape having a length, a width, and a depth, the rigid planar container comprising a plastic material or a metal material or a combination of both;
   b) a first layer comprising a porous mixture of organic and inorganic compounds, wherein the inorganic compounds are presernt in an amount of 20 volume % or less, based on a total volume of the porous mixture, and the inorganic compounds comprise sodium polyarylate; and
   c) a base and anchorage structure comprising
      i. a film of high-density polyethylene installed above an impermeable thermal insulant layer, wherein each of the film of high-density polyethylene and the impermeable thermal insulant layer occupies the entirety of the width and the length of the rigid planar container, and the impermeable thermal insulant layer is in contact with a rigid base;
      ii. a set of anchorage elements; and
      iii. a set of elements to increase the separation of the rigid base from a roof or a wall;
   wherein the rigid planar container contains the first layer and the first layer is located above the base and anchorage structure; and
   the rigid base has a perforated area.

2. The insulating system according to claim 1, wherein the length, the width and the depth of the rigid planar container do not exceed two meters each and the container has a maximum volume of eight cubic meters.

3. The insulating system according to claim 1, wherein the first layer occupies the entirety of the width and the length of the rigid planar container, and the first layer has a uniform thickness that is no less than seventy percent of the depth of the rigid planar container.

4. The insulating system according to claim 1, wherein the film of high-density polyethylene has a maximum thickness of ten percent of the depth of the rigid planar container.

5. The insulating system according to claim 1, wherein the impermeable thermal insulant layer has a maximum thickness of ten percent of the depth of the rigid planar container.

6. The insulating system according to claim 1 further comprising a film of plastic resins and a second thermal insulant installed between the film of high-density polyethylene and the impermeable thermal insulant layer, wherein the film of plastic resins and the second thermal insulant occupy the entirety of the width and the length of the rigid planar container.

7. The insulating system according to claim 1, wherein the rigid base has a total area and comprises a metal material or a plastic material or a combination of both and the rigid base has a maximum perforated area equal to fifty percent of the total area of the rigid base; and wherein the perforated area is distributed in uniformly arranged circles.

8. The insulating system according to claim 6, wherein the film of plastic resins has a maximum thickness of ten percent of the depth of the rigid planar container, and the plastic resin is selected from the group consisting of a polyacrylate, a polyvinyl chloride, and a glass fiber.

9. The insulating system according to claim 6, wherein the second impermeable thermal insulant layer has a maximum thickness of ten percent of the depth of the rigid planar container, and the second impermeable thermal insulant layer is selected from the group consisting of an expanded polystyrene layer, an extruded polystyrene layer, a foam glass layer, and an expanded cork layer.

10. The insulating system according to claim 1, wherein the set of anchorage elements comprises a plurality of bolts, adhesives or joints.

11. The insulating system according to claim 1, wherein the set of elements to increase the separation of the rigid base from the roof or the wall comprises a plurality of legs, boards, mounts or platforms.

12. The insulating system according to claim 1, wherein the impermeable thermal insulant layer is selected from the group consisting of an expanded polystyrene layer, an extruded polystyrene layer, a foam glass layer, an expanded cork layer, and a polyisocyanate layer.

13. The insulating system according to claim 1, wherein the organic compounds are present in an amount of 80 volume % or greater, based on the total volume of the porous mixture, and the first layer has a uniform thickness that is at least 75% of the depth of the rigid planar container.

14. The insulating system according to claim 1, wherein the porous mixture of organic and inorganic compounds comprises:

90 volume % organic compounds comprising top soil; and
10 volume % inorganic compounds comprising gravel, sand, stones and sodium polyacrylate, based on the total volume of the porous mixture.

15. The insulating system according to claim 14, wherein the porous mixture of organic and inorganic compounds comprises 1 volume % sodium polyactylate, based on the total volume of the porous mixture.

* * * * *